US012359505B2

(12) United States Patent
Wang

(10) Patent No.: US 12,359,505 B2
(45) Date of Patent: Jul. 15, 2025

(54) LOCKING HEAD APPARATUS OF DUAL AUTOMATIC LOCKING PROTECTIVE DOOR BAR

(71) Applicant: GUANGZHOU TUSUNNY HOME PRODUCTS CO., LTD., Guangdong (CN)

(72) Inventor: Hongjuan Wang, Guangdong (CN)

(73) Assignee: GUANGZHOU TUSUNNY HOME PRODUCTS CO., LTD., Guangzhou (CN)

( * ) Notice: Subject to any disclaimer, the term of this patent is extended or adjusted under 35 U.S.C. 154(b) by 320 days.

(21) Appl. No.: 18/319,776

(22) Filed: May 18, 2023

(65) Prior Publication Data

US 2024/0125150 A1 Apr. 18, 2024

(30) Foreign Application Priority Data

Oct. 17, 2022 (CN) ......................... 202222743147.2

(51) Int. Cl.
*E06B 9/86* (2006.01)
*E06B 9/08* (2006.01)
*E06B 9/80* (2006.01)

(52) U.S. Cl.
CPC .................. *E06B 9/86* (2013.01); *E06B 9/08* (2013.01); *E06B 2009/801* (2013.01)

(58) Field of Classification Search
CPC ..... E06B 9/08; E06B 9/82; E06B 9/86; E06B 9/88; E06B 2009/002; E06B 2009/801; E06B 11/02
See application file for complete search history.

(56) References Cited

U.S. PATENT DOCUMENTS 6,907,914 B1 * 6/2005 Lundh ........................ E06B 9/13 403/105
7,438,112 B2 * 10/2008 Cheng ................... E01F 13/028 242/385.4
9,482,052 B2 * 11/2016 Sousa ................... E01F 13/028
9,556,673 B2 * 1/2017 Stover ...................... E06B 11/00
11,939,817 B2 * 3/2024 Wang ......................... E06B 9/60
D1,075,474 S * 5/2025 Wang ............................. D8/343
2015/0041075 A1 * 2/2015 Henderson ................ E06B 9/08 242/382.5

(Continued)

FOREIGN PATENT DOCUMENTS

CN 217538514 U * 10/2022 ............... E06B 9/08
CN 220036552 U * 11/2023

*Primary Examiner* — Johnnie A. Shablack

(57) ABSTRACT

Provided is a locking head apparatus of a dual automatic locking protective door bar. The locking head apparatus includes a housing, a first toggling button, a second toggling button, a sliding seat, a fixation seat, a linkage locking mechanism and a rotating mechanism. A hydraulic rod is mounted inside the fixation seat, and the hydraulic rod is connected to the sliding seat. The second toggling button is exposed on the housing and connected with a toggling button seat. The toggling button seat is mounted inside the housing through a first spring, thereby forming an automatic resetting mechanism. With the adoption of the locking head apparatus, the dual automatic locking may be realized, the dual protection is achieved, and a child is prevented from opening the door bar after learning the unlocking skill.

8 Claims, 7 Drawing Sheets

(56) References Cited

U.S. PATENT DOCUMENTS

| | | | | |
|---|---|---|---|---|
| 2016/0168907 | A1* | 6/2016 | Byun | E06B 9/326<br>160/178.2 |
| 2018/0044982 | A1* | 2/2018 | Wang | E06B 9/08 |
| 2019/0078382 | A1* | 3/2019 | Wang | E06B 9/60 |
| 2021/0355751 | A1* | 11/2021 | Liang | E06B 9/60 |
| 2022/0056651 | A1* | 2/2022 | Liang | E06B 9/90 |
| 2022/0235594 | A1* | 7/2022 | Laws | E05F 5/02 |
| 2022/0412162 | A1* | 12/2022 | Wang | E06B 9/60 |
| 2023/0212909 | A1* | 7/2023 | Wang | E06B 9/0692<br>160/327 |
| 2024/0125150 | A1* | 4/2024 | Wang | E06B 9/08 |
| 2024/0344386 | A1* | 10/2024 | Wang | E06B 9/13 |
| 2025/0101800 | A1* | 3/2025 | Wang | E06B 9/17 |

* cited by examiner

LOCKING HEAD APPARATUS OF DUAL AUTOMATIC LOCKING PROTECTIVE DOOR BAR

TECHNICAL FIELD

The application relates to the technical field of protective products for children, and in particular to a locking head apparatus of a dual automatic locking protective door bar.

BACKGROUND

People usually mount a retractable protective door bar for an interior door to prevent loss, personal injury and other accidents that may be caused by a child walking out of a room. This kind of protective door bar mainly includes a retractable curtain subassembly, upper and lower fixation seats, a reel subassembly, a hook, a hook seat and the like. The retractable curtain subassembly is connected to the reel subassembly. The retractable curtain subassembly may be pulled out, and also be automatically scrolled through the reel subassembly. A locking mechanism is arranged inside the upper fixation seat generally. After locking, the reel subassembly may not rotate, and the retractable curtain subassembly may not be scrolled. After unlocking, the reel subassembly may rotate, in this way the retractable curtain subassembly may be automatically scrolled. The retractable protective door bar in the market may prevent the child from learning to unlock or unlocking by mistake so far. Generally, a button is designed as a mechanism that needs to be manually toggled to a locking position for locking and manually toggled to an unlocking position for unlocking. However, the mechanism may lead to a potential safety hazard when a user forgets to lock after drawing back and hanging a retractable curtain. To this end, people designed an apparatus adopting a hydraulic rod to realize automatic locking after setting the predetermined time, for example, Chinese patent with the licensed patent number of CN217538514 U provides a retractable protective door bar capable of automatically locking after the predetermined time. When the retractable curtain is drawn for multiple seconds, the hydraulic rod may automatically retract to achieve locking of the reel subassembly. However, the conventional protective door bar has only one locking mechanism, and may only achieve single protection. An elder child who has certain learning ability may open the door bar after simply learning from an adult and toggling the button, therefore the protective effect is not satisfactory.

SUMMARY

In allusion to defects of the traditional art, the application is to provide a locking head apparatus of a dual automatic locking protective door bar. The locking head apparatus is simple in structure, more difficult to be unlocked by a child, and has better protecting effect.

To solve the above-mentioned technical problem, the following technical solution is adopted. A locking head apparatus of a dual automatic locking protective door bar includes a housing, a first toggling button, a sliding seat, a fixation seat, a linkage locking mechanism and a rotating mechanism. The first toggling button is mounted on the sliding seat and exposed outside the housing, the sliding seat is mounted on the fixation seat, the rotating mechanism is mounted inside the housing, the rotating mechanism is in butt joint with the first toggling button through the linkage locking mechanism, and the rotating mechanism is connected to a reel subassembly. A hydraulic rod capable of retracting regularly is mounted inside the fixation seat, and the hydraulic rod is connected to the sliding seat to realize automatic resetting of the first toggling button. A second toggling button is arranged. The second toggling button is exposed on the housing and connected with a toggling button seat. The toggling button seat is mounted inside the housing through a first spring, thereby forming an automatic resetting structure, i.e. a second locking mechanism. The toggling button seat is provided with a locking block, a limiting seat is arranged opposite to the locking block, the limiting seat is fixedly connected to the sliding seat, and a limiting block opposite to the locking block is arranged on the limiting seat. When the second toggling button is in a locked state of the second locking mechanism, the locking block is in front of the limiting block, and may be adopted to prevent the limiting block from sliding forward and accordingly prevent the protective door bar from being unlocked. When the second toggling button is in an unlocked state of the second locking mechanism, the locking block and the limiting block are mutually staggered and the limiting block is not prevented by the locking block, in this way the limiting block may slide forward and accordingly the protective door bar is unlocked.

Further, a mounting slot is mounted inside the fixation seat, a length direction of the mounting slot and a sliding direction of the sliding seat are the same, and the limiting seat is mounted in the mounting slot together with a part of the limiting seat embedded into the sliding seat.

Further, an L-shaped structure is formed by the limiting block and the limiting seat, and the limiting block may be opposite to the locking block after stretching upward.

Further, the toggling button seat is mounted inside a mounting seat, thereby forming a slidable structure. The mounting seat is fixed inside the housing.

Further, the first spring is arranged inside the mounting seat, one end of the first spring is abutted against the mounting seat, and another end is abutted against the toggling button seat, in this way an elastic resetting structure is formed by the second toggling button.

Further, a toggling direction of the first toggling button is perpendicular to a toggling direction of the second toggling button.

Further, a stopping block is arranged on the fixation seat, and the stopping block is positioned beside the locking block, to form a stopping structure when toggling the second toggling button.

Further, the locking block, the toggling button seat and the second toggling button form an integral structure which may be integrally moulded from plastic.

The second locking mechanism is arranged to realize cooperative linkage with the hydraulic rod, in this way the reel subassembly may be unlocked by toggling the first toggling button only when the second locking mechanism is unlocked. The first toggling button is reset and locked in presence of the hydraulic rod after the predetermined time, in this way the reel subassembly is locked. At the same time, stopping of the second locking mechanism is removed, therefore the second locking mechanism recovers to lock the first toggling button, and accordingly the first toggling button may not be toggled to unlock the reel subassembly. In this way, the dual automatic locking is realized, and the child is prevented from opening the door bar after learning the unlocking skill.

Figure 1:
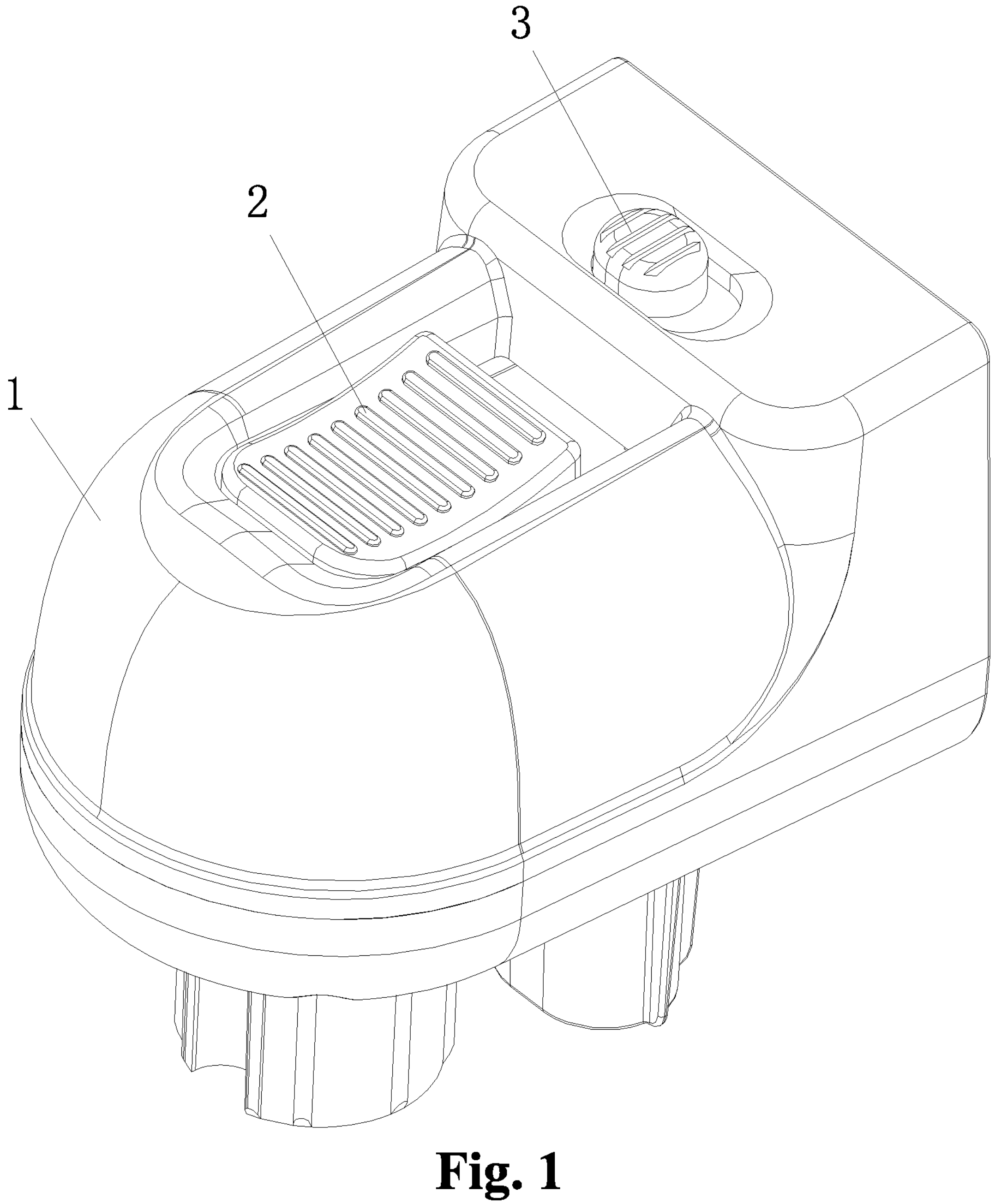
FIG. 1 is an overall schematic structural diagram of the application.

In the drawings, 1—Housing, 2—First toggling button, 3—Second toggling button, 31—Toggling button seat, 32—Locking block, 4—Sliding seat, 5—Fixation seat, 51—Limiting seat, 52—Limiting block, 53—Stopping block, 54—Mounting slot, 6—Mounting seat, 61—First spring, 7—Hydraulic rod, 8—Linkage locking mechanism, 9—Gear bearing subassembly, 10—Ratchet wheel, 11—Pawl, 12—Positioning slot, 13—Second spring, 14—Locking claw, 15—First push head, 16—Second push head.

DETAILED DESCRIPTION OF THE EMBODIMENTS

Figure 2:
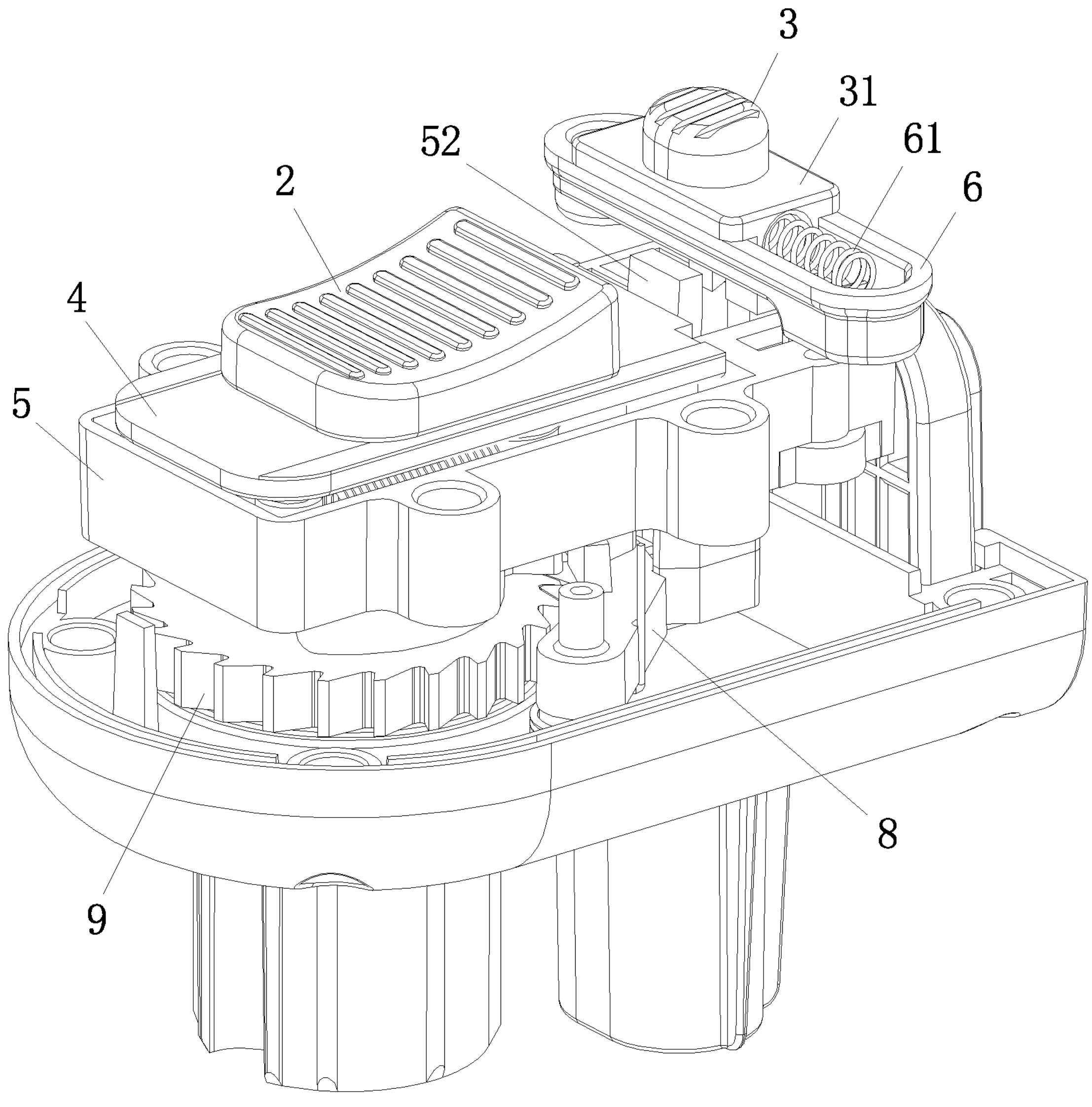
FIG. 2 is a schematic structural diagram of the application after removing a housing.
Figure 3:
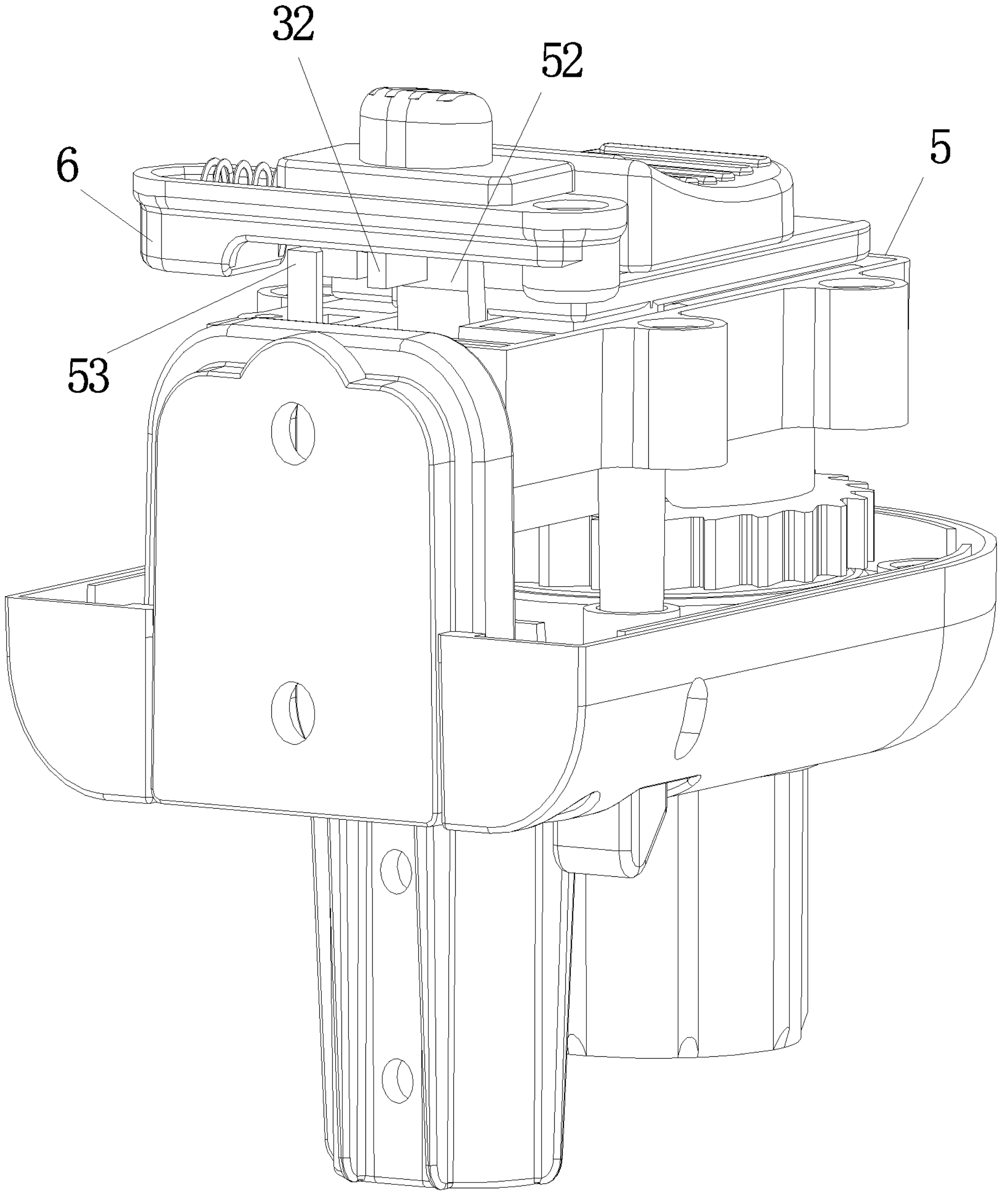
FIG. 3 is a schematic structural diagram of the application from another angle after removing a housing.
Figure 4:
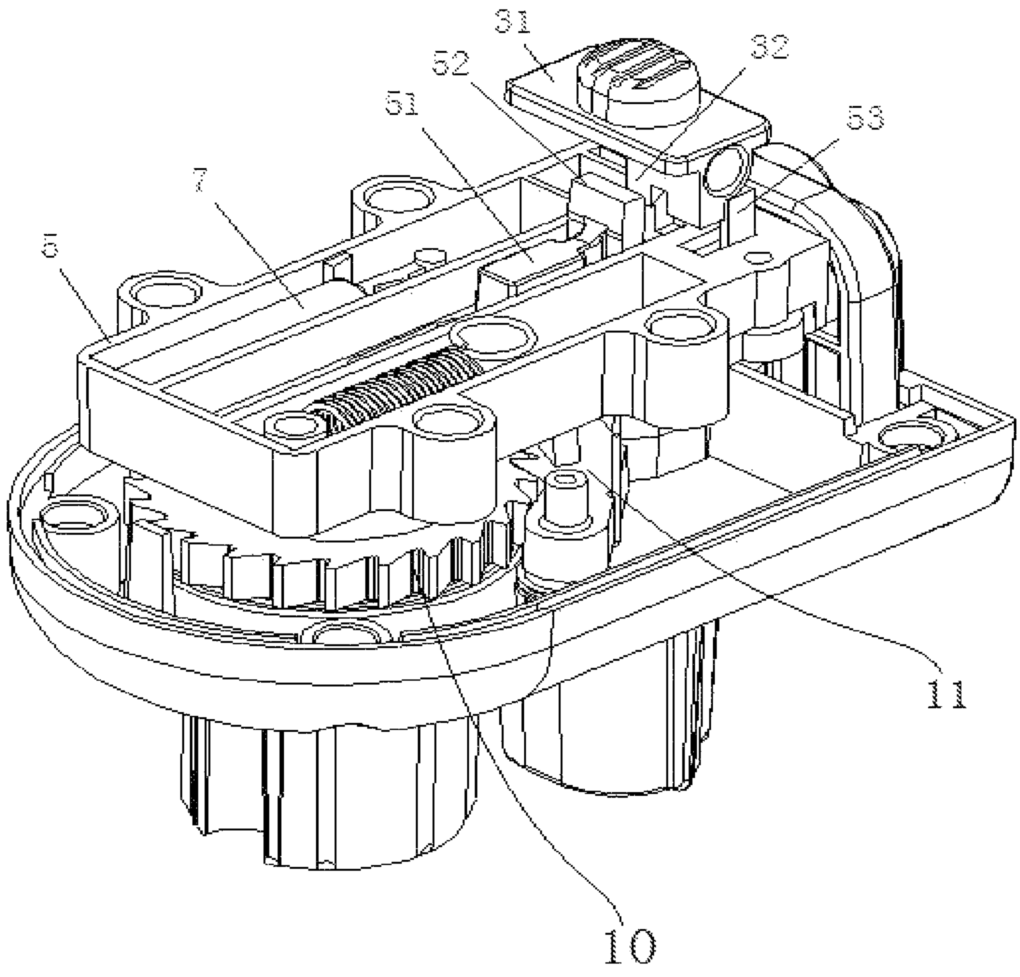
FIG. 4 is an internal schematic structural diagram of the application.
Figure 5:
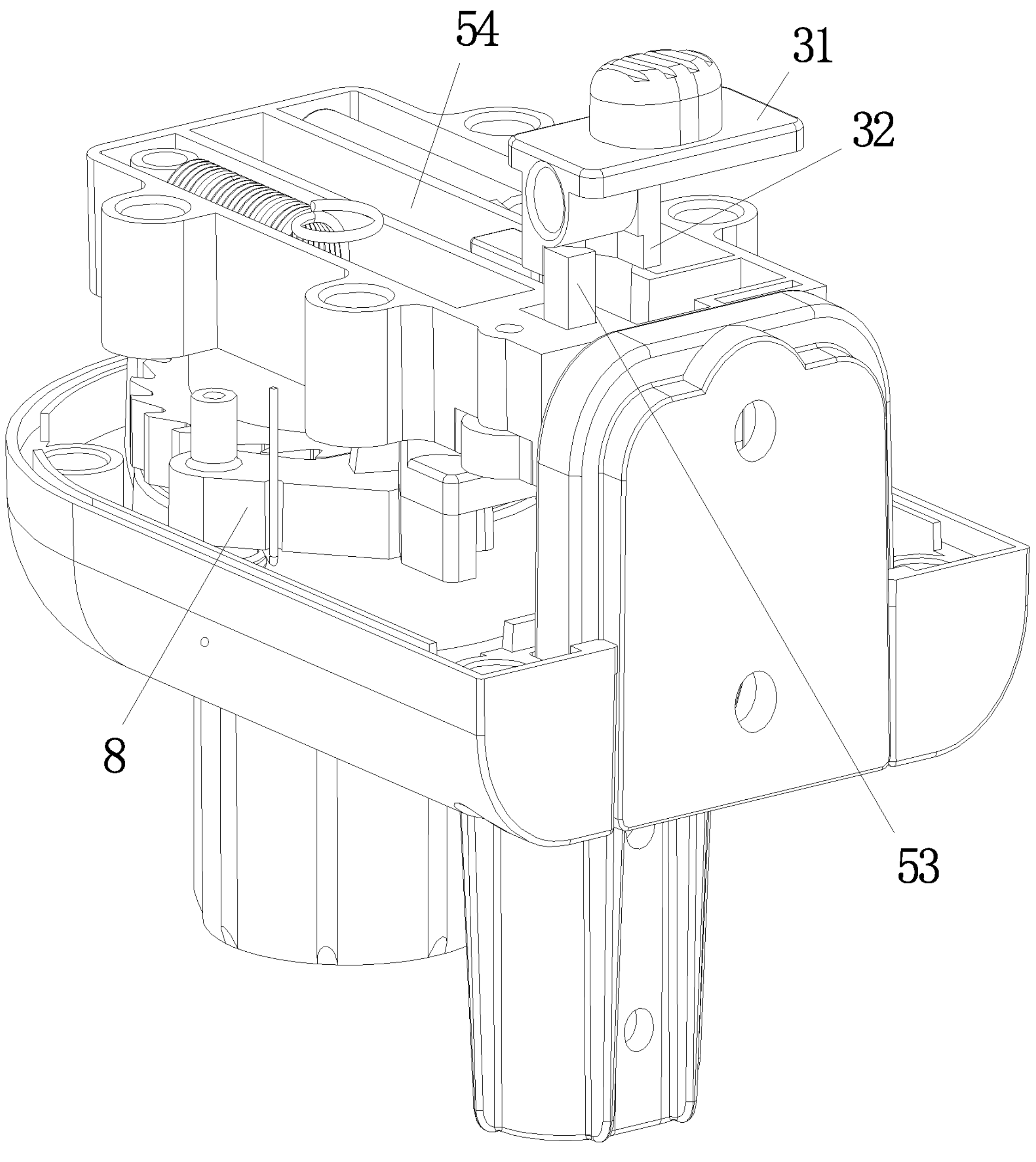
FIG. 5 is an internal schematic structural diagram of the application from another angle.
Figure 6:
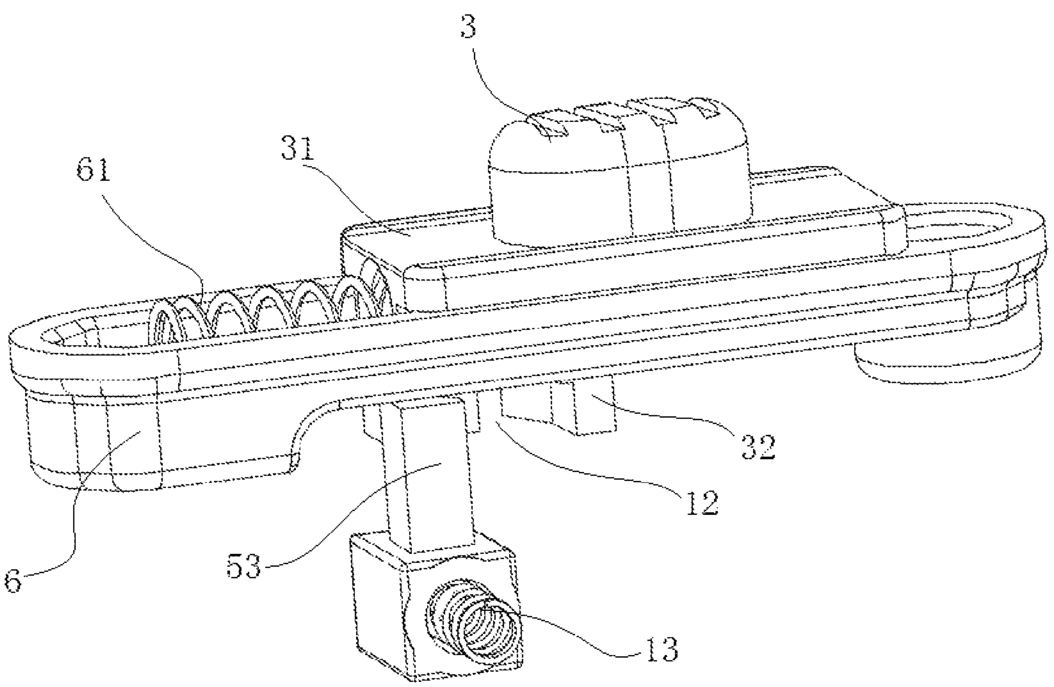
FIG. 6 is a schematic structural diagram of a stopping structure in the application.
Figure 7:
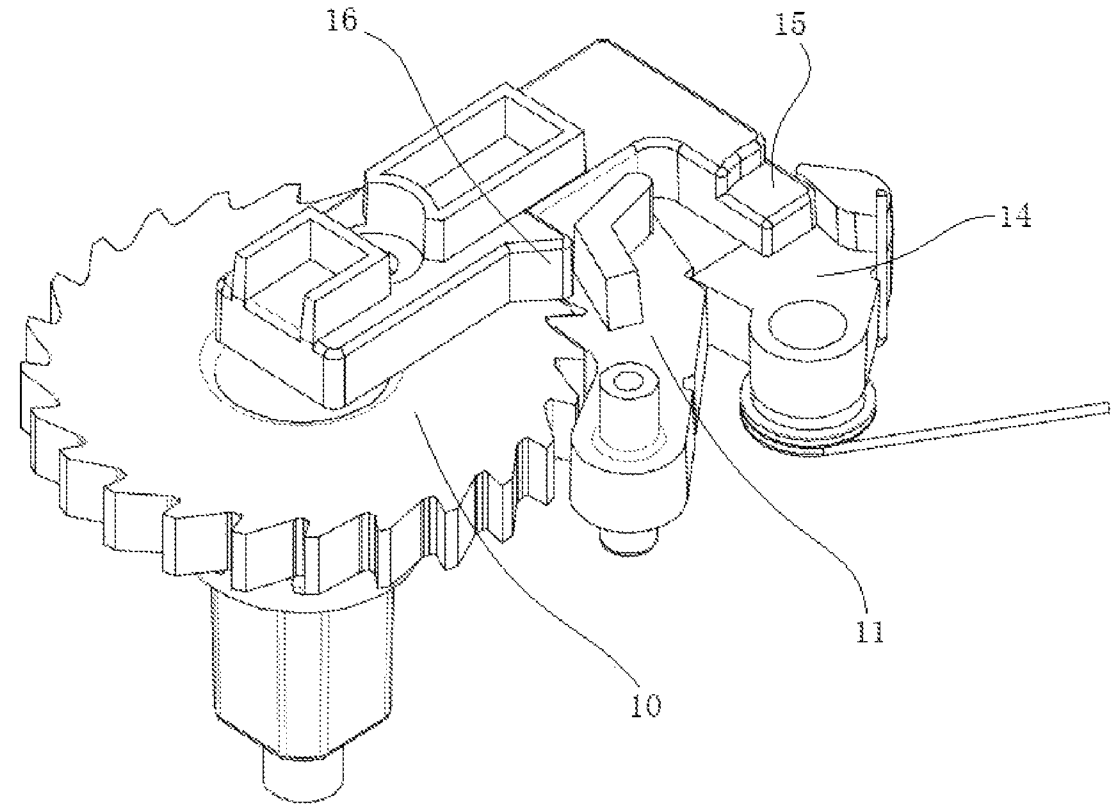
FIG. 7 is a schematic structural diagram of a linkage locking mechanism in another embodiment of the application.

In the embodiment, with reference to FIGS. 1-7, a locking head apparatus of a dual automatic locking protective door bar includes a housing 1, a first toggling button 2, a sliding seat 4, a fixation seat 5, a linkage locking mechanism 8 and a rotating mechanism. A gear bearing subassembly 9 is adopted as the rotating mechanism in the embodiment. The gear bearing subassembly 9 includes a ratchet wheel 10, and the ratchet wheel 10 is connected to a reel (no shown) of the protective door bar. The ratchet wheel 10 may rotate around an axis of the reel along with the reel. A protective curtain is wound on the reel. A torsional spring is arranged inside the reel and is adopted to drive the reel to rotate and scroll the curtain wound on the reel. The above-mentioned specific implementing mechanism, such as the reel driving the ratchet wheel 10 to rotate and the reel scrolling the curtain, belongs to the conventional art, has been elaborated in Chinese patent with the application number of CN113417556 A and will not be repeated any more here. The first toggling button 2 is fixedly mounted on the sliding seat 4 and exposed outside the housing 1, to facilitate toggling by a hand. The sliding seat 4 is mounted on the fixation seat 5, and may slide forward or backward relative to the fixation seat 5. The gear bearing subassembly 9 is mounted inside the housing 1, and the ratchet wheel 10 of the gear bearing subassembly 9 is connected to the reel of a reel subassembly. When the linkage locking mechanism 8 unlocks the ratchet wheel 10 of the gear bearing subassembly 9 by toggling the first toggling button 2, the gear bearing subassembly 9 may rotate, in this way the first unlocking of the protective door bar is completed, and accordingly the protective door bar may be pulled out or the curtain may be scrolled. Specifically, the linkage locking mechanism 8 includes a linkage seat and a locking part. The locking part (the pawl 11 is adopted in the embodiment) is clamped into the ratchet wheel 10 in presence of the torsion of a torsional spring, to prevent the ratchet wheel 10 from rotating. The linkage seat is connected to the first toggling button 2. The first toggling button 2 is toggled by the hand to move forward, in this way the linkage seat is driven to move. The linkage seat drives the pawl 11 to be separated from the ratchet wheel 10 through an arranged linkage arm. At the moment, the ratchet wheel 10 and the reel may rotate, and the curtain may be pulled out and scrolled. An implementing mechanism of the linkage locking mechanism 8 has been elaborated in the Chinese patent with the licensed patent number CN217538514 U and will not be repeated any more here. A hydraulic rod 7 capable of retracting regularly is mounted inside the fixation seat 5, and the hydraulic rod 7 is connected to the sliding seat 4 to realize automatic resetting of the first toggling button 2. It is about 15 seconds, and other time may be set as well.

The locking head apparatus of the dual automatic locking protective door bar may further be provided with a second toggling button 3. The second toggling button 3 is exposed on the housing 1 and connected to a toggling button seat 31, and the toggling button seat 31 is mounted inside the housing 1 through a first spring 61, in this way an automatic resetting mechanism is formed. The toggling button seat 31 is provided with a locking block 32, a limiting seat 51 is arranged opposite to the locking block 32, and the limiting seat 51 is fixedly connected to the sliding seat 4. A limiting block 52 opposite to the locking block 32 is arranged on the limiting seat 51. When the second toggling button 3 is in a locked state of the second locking mechanism, the locking block 32 is in front of the limiting block 52, to prevent the limiting block 52 from sliding forward and accordingly prevent the protective door bar from being unlocked. At the moment, the first toggling button 2 may not be toggled, and the curtain may not be pulled. The second toggling button 3 is pushed by a hand to an unlocking status of the second locking mechanism when the elastic force of the first spring 61 is overcome. At the moment, the locking block 32 and the limiting block 52 are mutually staggered, the locking block 32 fails to prevent the limiting block 52. At the moment, the limiting block 52 may slide forward along with toggling of the first toggling button 2 to unlock the protective door bar, in this way the curtain may be pulled and scrolled.

A mounting slot 54 is mounted inside the fixation seat 5, a length direction of the mounting slot 54 and a sliding direction of the sliding seat 4 are the same, and the limiting seat 51 is mounted in the mounting slot 54 together with a part of the limiting seat 51 embedded into the sliding seat 4, to realize slidable connection of the limiting seat 51 and the mounting slot 54. The limiting seat 51 may slide forward or backward in the mounting slot 54 along with the length direction of the mounting slot 54, and the limiting block 52 connected to the limiting seat 51 may slide forward or backward along with the length direction of the mounting slot 54.

An L-shaped structure is formed by the limiting block 52 and the limiting seat 51, and the limiting block 52 is opposite to the locking block 32 after stretching upward.

The toggling button seat 31 is mounted inside a mounting seat 6, thereby forming a slidable structure. The mounting seat 6 is fixed inside the housing 1. The first spring 61 is arranged inside the mounting seat 6, one end of the first spring 61 is abutted against the mounting seat 6, and another end is abutted against the toggling button seat 31, in this way an elastic resetting apparatus is formed by the second toggling button 3. When the curtain is in an unlocked state, the first toggling button 2, the sliding seat 4 and the limiting block 52 may gradually reset along with retraction of the hydraulic rod 7. When the locking block 32 is not stopped by the limiting block 52 any longer, the locking block 32 may reset along with the toggling button seat 31 in presence of the first spring 61, in this way the first toggling button 2 is locked.

A movable direction of the first toggling button 2 is perpendicular to a movable direction of the second toggling button 3.

A stopping block 53 is arranged on the fixation seat 5, and positioned beside the locking block 32, to form a stopping structure when toggling the second toggling button 3. The stopping structure is more specifically shown in FIG. 6. A positioning slot 12 is arranged inside the locking block 32. When the second toggling button 3 is toggled by the hand to the unlocked state of the second locking mechanism, the positioning slot 12 is aligned with the stopping block 53. The stopping block 53 may be clamped into the positioning slot 12 of the locking block 32 in presence of a second spring 13, to fix a position of the locking block 32. In this way, the locking block 32 may be prevented from stopping the limiting block 52 to move forward after resetting in presence of the first spring 61. When the position of the locking block 32 is fixed and the sliding seat 4 slides forward along with toggling of the first toggling button 2, the sliding seat 4 may drive the stopping block 53 to be separated from the positioning slot 12, in this way the locking of the locking block 32 by the stopping block 53 is removed. At the same time, when sliding forward along toggling of the first toggling button 2, the limiting block 52 may stay on a left side of the locking block 32, in this way the locking block 32 is prevented from resetting to the unlocked state of the second locking mechanism in presence of the first spring 61. When the sliding seat 4 is pulled back by the hydraulic rod 7 after the predetermined time, the limiting block 52 may draw back accordingly, i.e. the locking of the locking block 32 may be removed by the limiting block 52.

In another embodiment, the linkage locking mechanism further includes a locking claw 14. The locking claw 14 is clamped into a tooth slot arranged on a side wall of the pawl 11 in presence of the torsion of the torsional spring, accordingly the pawl 11 is driven to be clamped into the ratchet wheel 10, to prevent the ratchet wheel 10 from rotating. When only one pawl 11 is clamped into the ratchet wheel 10, the torsional spring inside the reel may drive the reel and the ratchet wheel to rotate anticlockwise upon opening the curtain. At the moment, the pawl 11 may be bounced by the ratchet wheel 10, and the reel may automatically scroll. Another locking claw 14 is arranged. The locking claw 14 is clamped into the tooth slot arranged on the side wall of the pawl 11 in presence of the toggling force of the torsional spring, in this way the pawl 11 may be prevented from being bounced, and the reel may not scroll.

Correspondingly, the linkage seat is provided with a first push head 15 and a second push head 16. When the linkage seat is pushed, the first push head 15 arranged on the linkage seat pushes the locking claw 14 away first, in this way the locking claw 14 is separated from the tooth slot arranged on the pawl 11. Then the second push head 16 arranged on the linkage seat pushes the pawl 11 away, in this way the pawl 11 is separated from the ratchet wheel 10. When the linkage seat is driven to reset by the hydraulic rod 7, the locking claw 14 is clamped again into the tooth slot arranged on the side wall of the pawl 11 in presence of the torsion of the torsional spring, while the pawl 11 is clamped into the ratchet wheel 10 again in presence of the locking claw 14.

A first locking mechanism is formed by the first toggling button 2, the sliding seat 4 and the linkage locking mechanism 8 in the application. The first locking mechanism locks the ratchet wheel 10 of the gear bearing subassembly 9 directly, to prevent the gear bearing subassembly 9 from rotating. In this way, the first locking of the protective door bar is completed. The second locking mechanism is formed by the second toggling button 3, the toggling button seat 31, the fixation seat 6, the locking block 32, the first spring 61, the limiting block 52, the limiting seat 51 and the stopping structure of the application. When the second locking mechanism is in the locked state, the locking block is in front of the limiting block, and may prevent the limiting block from sliding forward, in this way the protective door bar may not be unlocked. When the second toggling button is in the unlocked state of the second locking mechanism, the locking block and the limiting block are mutually staggered and the locking block fails to prevent the limiting block, in this way the limiting block may slide forward and accordingly the protective door bar is unlocked. The first locking mechanism of the application has been elaborated in Chinese application with the authorized patent number of CN217538514 U. An objective of the application is to further optimize an existing apparatus. Through adding the second locking mechanism, the dual protection may be achieved, and the child may be prevented from unlocking and opening the door bar after learning easily.

The above describes the application in detail. The above is only the preferred embodiment of the application and not intended to limit the scope of implementation of the application. Any equipollent modifications and improvements on the basis of the scope of the application shall fall within the scope of the application.

What is claimed is:

1. A locking head apparatus of a dual automatic locking protective door bar, comprising a housing, a first toggling button, a sliding seat, a fixation seat, a linkage locking mechanism and a rotating mechanism, the first toggling button being fixedly mounted on the sliding seat and exposed outside the housing, the sliding seat being mounted on the fixation seat and slidably connected to the fixation seat, and the rotating mechanism being mounted inside the housing and being adopted to connect to a reel subassembly; a hydraulic rod capable of retracting regularly being mounted inside the fixation seat, and the hydraulic rod being connected to the sliding seat to realize automatic resetting of the first toggling button; further comprising a second toggling button, the second toggling button being exposed on the housing and connected with a toggling button seat, the toggling button seat being mounted inside the housing through a first spring, thereby forming an automatic resetting mechanism; the toggling button seat being fixedly provided with a locking block, a limiting seat being arranged opposite to the locking block, and the limiting seat being fixedly connected to the sliding seat; a limiting block opposite to the locking block being arranged on the limiting seat, wherein, when the second toggling button is in a locked state of the second locking mechanism, the locking block is in front of the limiting block to prevent the limiting block from sliding forward and accordingly prevent the protective door bar from being unlocked; and when the second toggling button moves to an unlocked state of the second locking mechanism, the locking block and the limiting block are mutually staggered and the locking block fails to prevent the limiting block, in this way the limiting block slides forward and accordingly the protective door bar is unlocked.

2. The locking head apparatus of the dual automatic locking protective door bar as claimed in claim 1, wherein, a mounting slot is mounted inside the fixation seat, a length direction of the mounting slot and a sliding direction of the sliding seat are the same, and the limiting seat is mounted in the mounting slot together with a part of the limiting seat embedded into the sliding seat.

3. The locking head apparatus of the dual automatic locking protective door bar as claimed in claim 2, wherein, an L-shaped structure is formed by the limiting block and the limiting seat, and the limiting block is opposite to the locking block after stretching upward.

4. The locking head apparatus of the dual automatic locking protective door bar as claimed in claim 1, wherein, the toggling button seat is mounted inside a mounting seat, thereby forming a slidable structure; and the mounting seat is fixed inside the housing.

5. The locking head apparatus of the dual automatic locking protective door bar as claimed in claim 4, wherein, the first spring is arranged inside the mounting seat, one end of the first spring is abutted against the mounting seat, and another end is abutted against the toggling button seat, in this way an elastic resetting structure is formed by the second toggling button.

6. The locking head apparatus of the dual automatic locking protective door bar as claimed in claim 5, wherein, a moving direction of the first toggling button is perpendicular to a moving direction of the second toggling button.

7. The locking head apparatus of the dual automatic locking protective door bar as claimed in claim 6, wherein, a stopping block is arranged on the fixation seat, and the stopping block is positioned beside the locking block, to form a stopping structure when toggling the second toggling button.

8. The locking head apparatus of the dual automatic locking protective door bar as claimed in claim 1, wherein, the locking block, the toggling button seat and the second toggling button form an integral structure.

* * * * *